(12) United States Patent
Kim et al.

(10) Patent No.: US 7,031,102 B2
(45) Date of Patent: Apr. 18, 2006

(54) POLE-BASE ASSEMBLY DRIVING APPARATUS FOR MAGNETIC RECORDING/READING APPARATUS

(75) Inventors: Bong-joo Kim, Suwon (KR); Jae-hoon Sim, Suwon (KR); Jun-young Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 10/714,938

(22) Filed: Nov. 18, 2003

(65) Prior Publication Data

US 2004/0125500 A1 Jul. 1, 2004

(30) Foreign Application Priority Data

Dec. 31, 2002 (KR) ............. 10-2002-0088238

(51) Int. Cl.
*G11B 15/665* (2006.01)

(52) U.S. Cl. ...................................... 360/85
(58) Field of Classification Search ................ 360/85
See application file for complete search history.

(56) References Cited

U.S. PATENT DOCUMENTS

| 6,157,512 | A | * | 12/2000 | Matsuoka et al. | ............ | 360/85 |
| 6,724,565 | B1 | * | 4/2004 | Hisadomi | ............ | 360/85 |
| 6,788,491 | B1 | * | 9/2004 | Hayashi | ............ | 360/85 |
| 6,935,545 | B1 | * | 8/2005 | Kim et al. | ............ | 226/187 |
| 2004/0125499 | A1 | * | 7/2004 | Kim et al. | ............ | 360/85 |

* cited by examiner

*Primary Examiner*—Allen Cao
(74) *Attorney, Agent, or Firm*—Roylance Abrams Berdo & Goodman LLP

(57) ABSTRACT

A driving apparatus for loading/unloading a pair of pole-base assemblies that are reciprocated along a guide rail formed on a main deck to move a magnetic tape to contact to a head drum. The driving apparatus includes a first and a second link member, each connected with one end to each pole-base assembly, a first and a second loading gears, each connected to the other end of the first and the second link member, and being rotated in association with each other; and a main gear which is rotated by the power received from a driving motor mounted on the main deck and selectively engaged with the first loading gear upon rotation thereof. The main gear is rotated in association with one of the loading gears within a desired rotational range upon rotation thereof, so as to transfer power for loading/unloading the pole-base assembly.

14 Claims, 7 Drawing Sheets

POLE-BASE ASSEMBLY DRIVING APPARATUS FOR MAGNETIC RECORDING/READING APPARATUS

FOREIGN PRIORITY INFORMATION

This application claims priority under 35 U.S.C. § 119 to Korean Patent Application Serial No. 2002-88238, filed in the Korean Intellectual Property Office on Dec. 31, 2002 the contents of said application being incorporated herein by reference.

BACKGROUND OF THE INVENTION

1. Field of the Invention

The present invention relates to a magnetic recording/reading apparatus, and more particularly, to a pole-base assembly driving apparatus for a magnetic recording/reading apparatus, which loads/unloads the pole-base assembly.

2. Description of the Related Art

FIG. 1 is an exploded perspective view partially showing a moving deck of a camcorder as an example of a conventional magnetic recording/reading apparatus. Referring to FIG. 1, a drum base 2 is mounted on a main deck 1. A head drum (not shown) is rotatably disposed at the drum base 2. The head drum contacts with a magnetic tape withdrawn from a tape cassette and records/reads information. On the main deck 1, there is provided a movable pair of pole-base assemblies 3 and 4 for withdrawing and then closely contacting the magnetic tape to the head drum. In other words, the pole-base assemblies 3 and 4 are loaded/unloaded along a guide rail 2a provided at the drum base 2. The pole-base assemblies 3 and 4 may be formed into various types.

The camcorder further includes a driving apparatus for loading/unloading the pole-base assemblies 3 and 4. Power for a driving motor 5 disposed at the main deck 1 is transferred through a desired path to the main gear 6 on the main deck 1. As shown in FIG. 2, a relay gear 7, engaged with the main gear 6, transfers power to a first loading gear 8 and then to a second loading gear 9. The first loading gear 8 and second loading gear 9 are engaged with each other. Link members 10, 11 are connected to the first and second loading gears 8 and 9, respectively, and are adapted to load/unload each of the pole-base assemblies 3 and 4 supported by an end thereof, while being rotated together with the loading gears 8 and 9.

However, in a conventional pole-base assembly driving apparatus having the construction described above, there is a problem in that the driving apparatus occupies a large space and has a complicated structure, since the main gear 6, the relay gear 7 and the loading gears 8 and 9 are respectively disposed at a desired position and then interlocked with each other. In particular, there is a problem in that the number of components is large and thus the manufacturing costs and the number of assembling processes are higher.

SUMMARY OF THE INVENTION

Therefore, it is an object of the present invention to provide a pole-base assembly driving apparatus for a magnetic recording/reading apparatus, which has a reduced number of components and an improved structure.

To achieve the aforementioned object of the present invention, an embodiment of the present invention provides a driving apparatus for loading/unloading a pair of pole-base assemblies that moves a magnetic tape in contact with a head drum, while being reciprocated along a guide rail formed on a main deck, comprising a first and second link member, of which one end is connected with each pole-base assembly. The driving apparatus further includes a first and second loading gear, which is connected to the other end of the first and second link member and interlocked with each other, and also includes a main gear which is rotated by receiving power from a driving motor mounted on the main deck, and selectively engaged with the first loading gear upon rotation thereof. The main gear is interlocked with one of the loading gears within a desired rotational region upon rotation thereof so as to transfer power for loading/unloading the pole-base assembly.

In furtherance of the objects of the present invention, the first loading pole-base assembly comprises a first gear part engaged with the second loading gear, and a second gear part stepped with respect to the first gear part, so as to be engaged with the main gear. Further, the second gear part is formed at a lower position than the first gear part and has a larger diameter than the first gear part. The second gear part also has a gear tooth formed only at a desired region of an outer surface of the first loading gear, so as to be engaged with the main gear at only the desired region. The apparatus further comprises a large gear groove formed at both ends of the second gear part so as to be set about engaging with the main gear according to a rotational direction of the main gear, the gear groove formed to be relatively deep. Further, the main gear has a pair of large gear teeth corresponding to the large gear groove, and the gear teeth are formed to be relatively larger than other gear teeth. The pair of large gear teeth of the main gear are formed at a position lower than other gear teeth formed at an outer circumference of the main gear.

Furthermore, the main gear is formed at an outer circumference of the gear teeth, where it receives the power from the driving motor. A portion of the gear teeth which are positioned at a desired region, are engaged or disengaged with the second gear part by a pair of gear teeth which are relatively larger.

It is yet another object of the present invention to provide a main gear which comprises a main gear part formed at an outer circumference to receive power, a connecting gear part formed at a desired region so as to be engaged with the second gear part at a position lower than the main gear part, and a pair of large gear teeth formed at both ends portion of the connecting that corresponds to each large gear groove and which is larger than the connecting gear part. The main gear further comprises a slide wing part protruded in the form of an arc at a position lower than the main gear part that is slidably contacted with the outer circumference of the second gear part.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Various embodiments of the present invention will be described in detail with reference to the annexed drawings.

Figure 1:
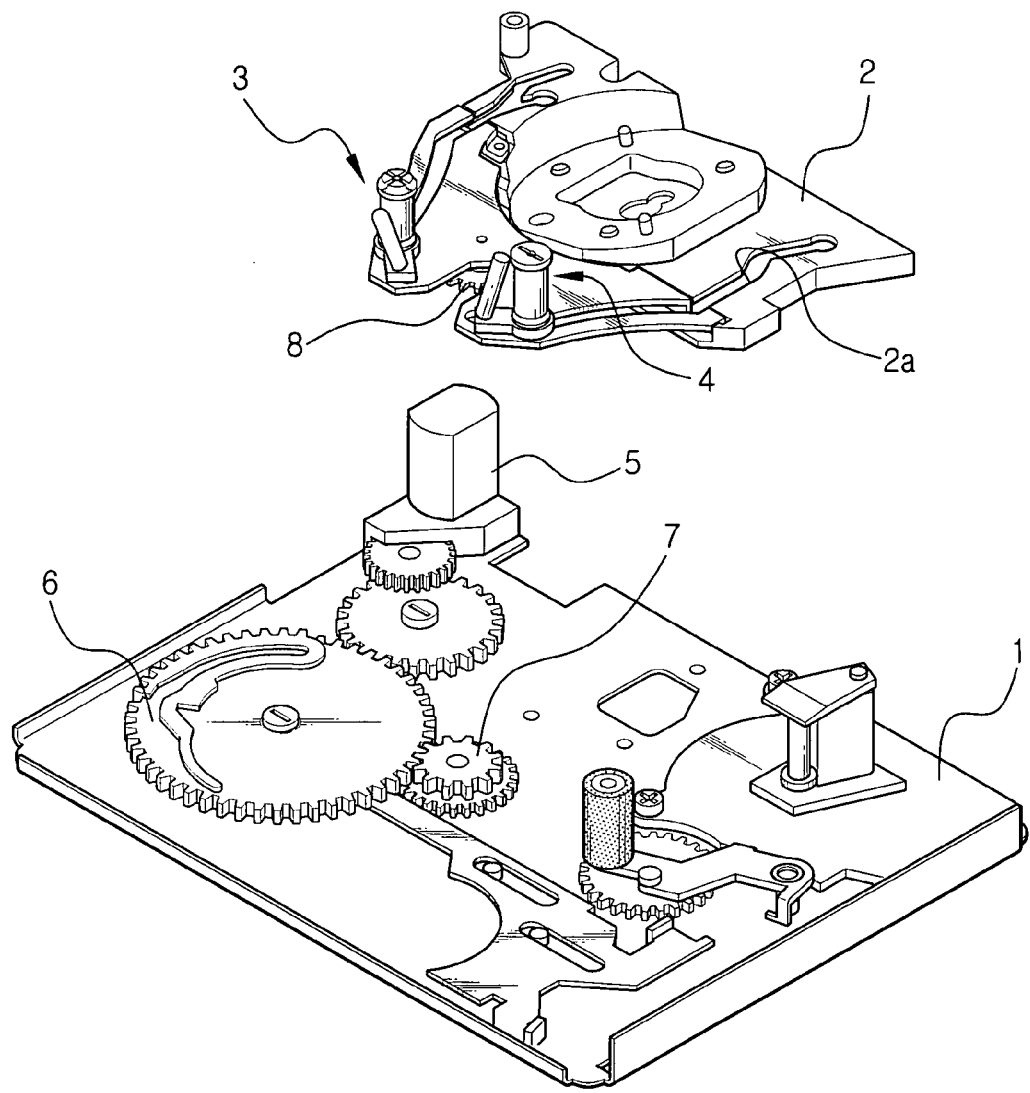
FIG. 1 is an exploded perspective view schematically showing a conventional magnetic recording/reading apparatus.
Figure 2:
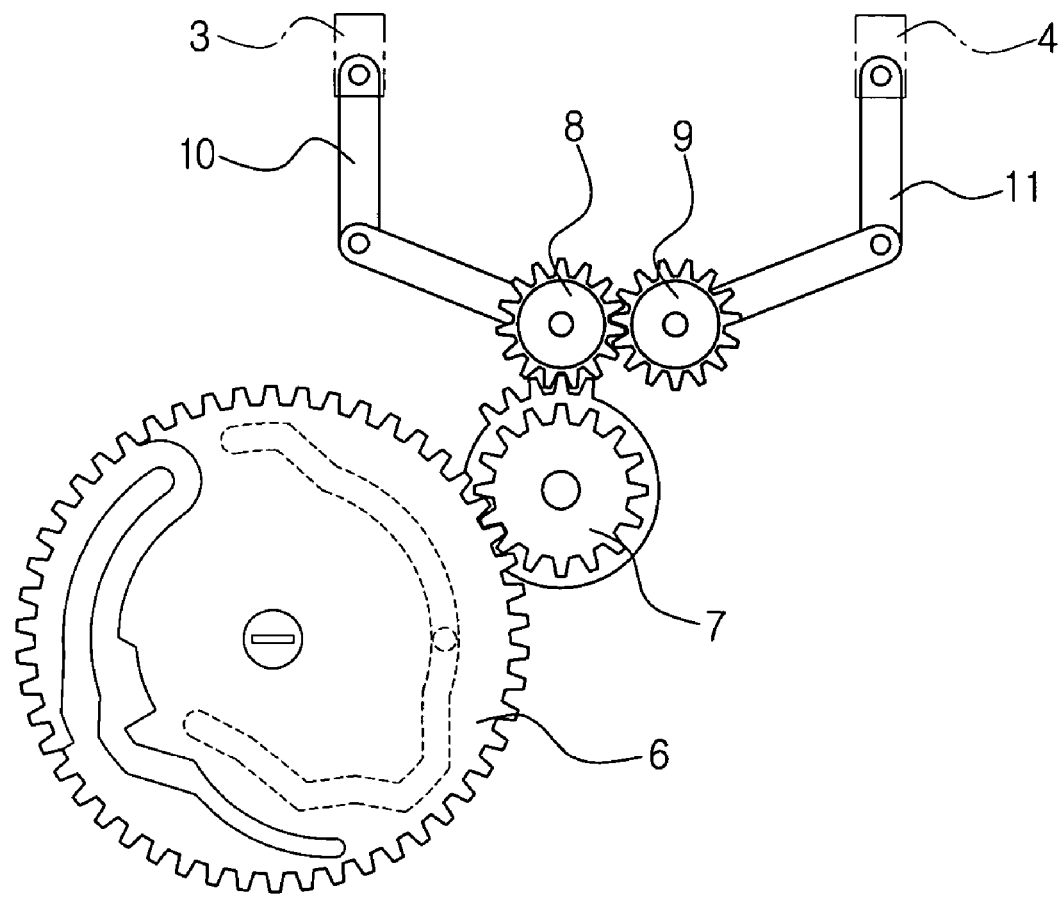
FIG. 2 is a schematic partial view showing a main part of FIG. 1.
Figure 3:
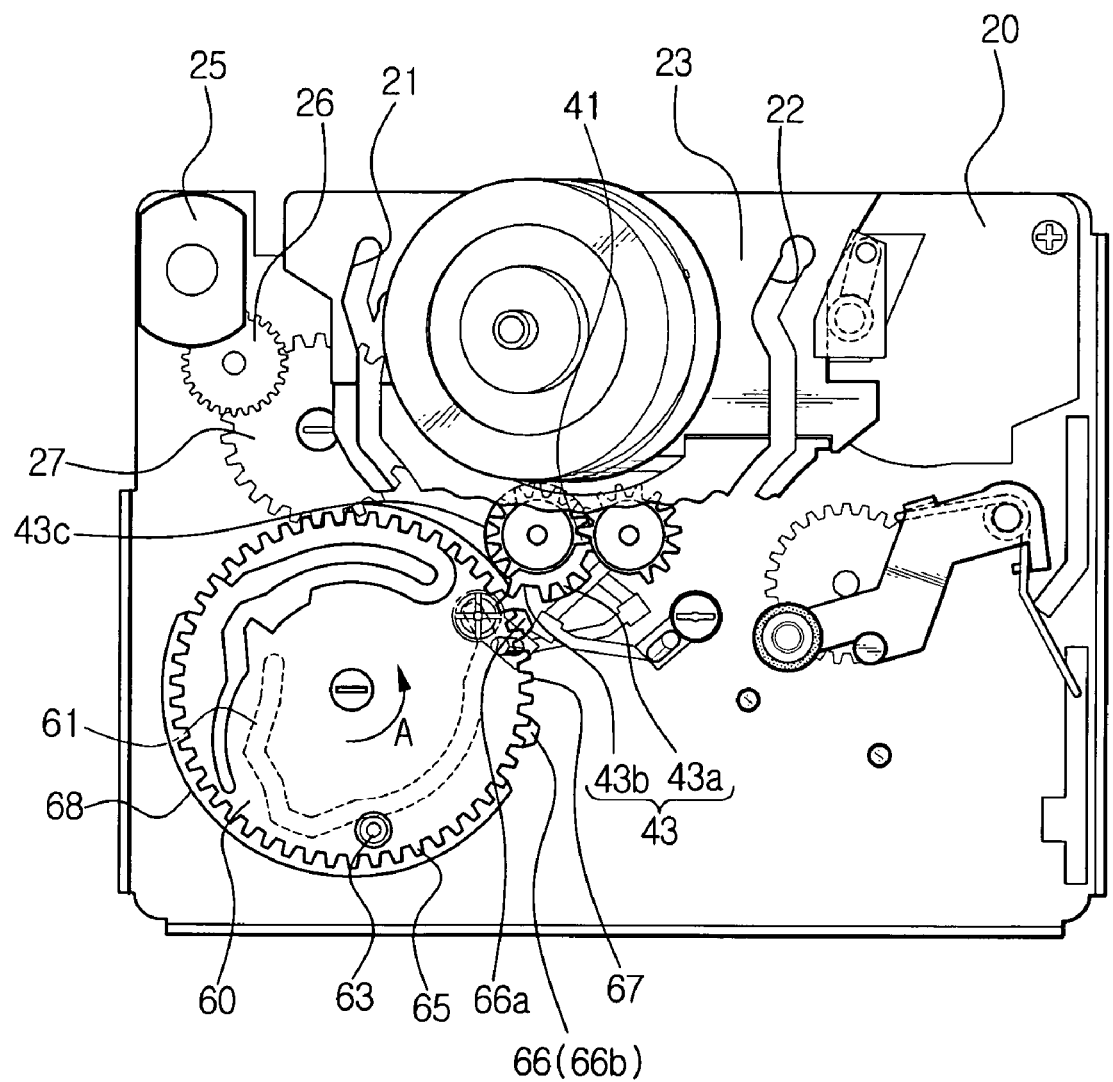
FIG. 3 is a schematic plan view showing a pole-base assembly driving apparatus for a magnetic recording/reading apparatus according to an embodiment of the present invention.
Figure 4:
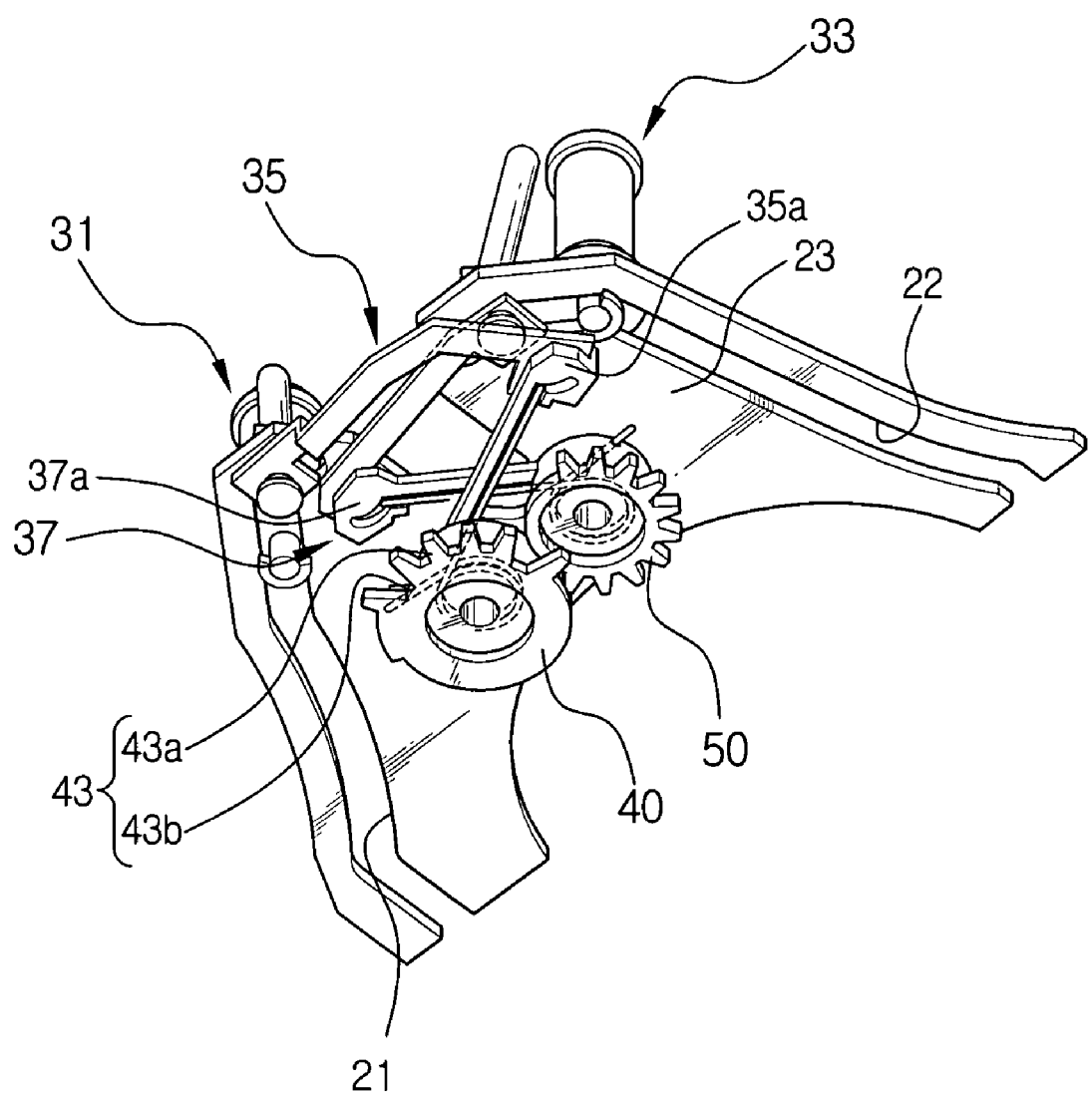
FIG. 4 is a perspective view showing a part of FIG. 3.

Referring to FIGS. 3 and 4, a pole-base assembly driving apparatus for a magnetic recording/reading apparatus according to an embodiment of the present invention is shown. The pole-base assembly driving apparatus loads/unloads a first and second pole-base assembly 31, 33 allowing a magnetic tape to contact a head drum (not shown) while moving along a guide rail 21, 22 mounted on a main deck 20.

The pole-base assembly driving apparatus comprises first and second link members 35 and 37, respectively connected to the first and second pole-base assemblies 31 and 35, a pair of first and second loading gears 40 and 50, connected to each of the first and second link members 35 and 37, and a main gear 60, rotatably mounted on the main deck 20 to be selectively engaged with the first loading gear 40.

The first and second loading gears 40 and 50 are rotatably disposed on a rail plate 23 in which the guide rails 21 and 22 are formed. Each of the first and second loading gears 40 and 50 are interlocked with each other.

One end of the first link member 35 is fixed to the first loading gear 40, and the other end is rotatably connected to the first pole-base assembly 31. Further, the first link member 35 has a joint part 35a at a center portion thereof. When the first loading gear 40 is rotated, the first link member 35 is folded or spread with the joint part 35a in the center. Therefore, the pole-base assembly 31 is moved.

One end of the second link member 37 is fixed to the second loading gear 50, and the other end is rotatably connected to the second pole-base assembly 33. Further, the second link member 37 also has a joint part 37a at a center portion thereof.

The first loading gear 40 is provided with a first gear part 41 engaged with the second loading gear 50 and a second gear part 43 selectively engaged with the main gear 60. The first and second gear parts 41 and 43 respectively have a different height to be stepped. The first gear part 41 is positioned at a higher place than the second gear part 43. Also, the first gear part 41 is formed to have a smaller diameter than the second gear part 43.

A gear tooth 43a is formed at a desired region of the second gear part 43 in a circumferential direction, so that the second gear part 43 is engaged with only a desired region of the main gear 60. At both sides of the gear tooth 43a, there are gear grooves 43b formed to be engaged with the main gear 60 which are relatively deep and large 60.

The main gear 60 is rotatably mounted on the main deck 20 so as to selectively transfer the power to the first loading gear 40. The main gear 60 receives power from the driving motor 25, mounted on the main deck 20, through a plurality of power transmission gears 26 and 27, which rotate it. Further, a cam groove 61 is formed in the main gear 60 so as to be interlocked with a sliding member (not shown). The sliding member is interlocked with a review arm unit and a reel brake (not shown), while being reciprocated right and left on the main deck. Furthermore, a guide pin 63 protrudes above the main gear 60 interlocking it with a sub deck (not shown) mounted on the main deck 20. Consequently, the sub deck is loaded/unloaded toward the head drum, while supporting a cassette tape.

The main gear 60 rotates in the A direction upon a loading operation and rotates in the "B" direction upon an unloading operation. The main gear is provided with a main gear part 65 that engages the power transmission gear 27, and a pair of large gear teeth 66 which is formed to be larger than the main gear part 65 and at a position lower than the main gear part 65. The main gear is further provided with a connecting gear part 67 which is formed at a position lower than the main gear part 65 between the large gear teeth 66, and a slide wing part 68 which is formed out of the connecting gear part 67 and the large gear teeth 66 so as to have the same height as the large gear teeth 66.

The large gear teeth 66 are set apart from each other so as to correspond to the large gear groove 43b of the loading gear 40. Of course, the large gear teeth 66 are formed to protrude at a position lower than the main gear part 65, i.e., at a position lower than the power transmission gear 27, and thus they are prevented from interfering with the power transmission gear 27. The large gear teeth 66 does not interfere with the first gear part 41 of the loading gear 40 and selectively engages the second gear part 43. The connecting gear part 67 is formed, preferably, in the region between the large teeth 66, and is also integrally formed with the main gear part 65 in the same radius. The connecting gear part 67 engages the gear tooth 43a of the second gear part 43 of the first loading gear 40. The slide wing part 68 is formed at an outer circumference of the main gear 60, so as to have the same height as the connecting gear part 67 and the large gear teeth 66. In addition, the slide wing part 68 protrudes in the form of an arc so as to have a larger diameter than the main gear part 65. Therefore, the slide wing part 68 is slidably contacted with a non-gear part 43c of the second gear part 43. Therefore, when the main gear 60 is not engaged with the first loading gear 40, the slide wing part 68 is maintained so as to slidably contact with the non-gear part 43c.

Operation of the pole-base assembly driving apparatus having the structure discussed above will now be fully described.

Figure 5:
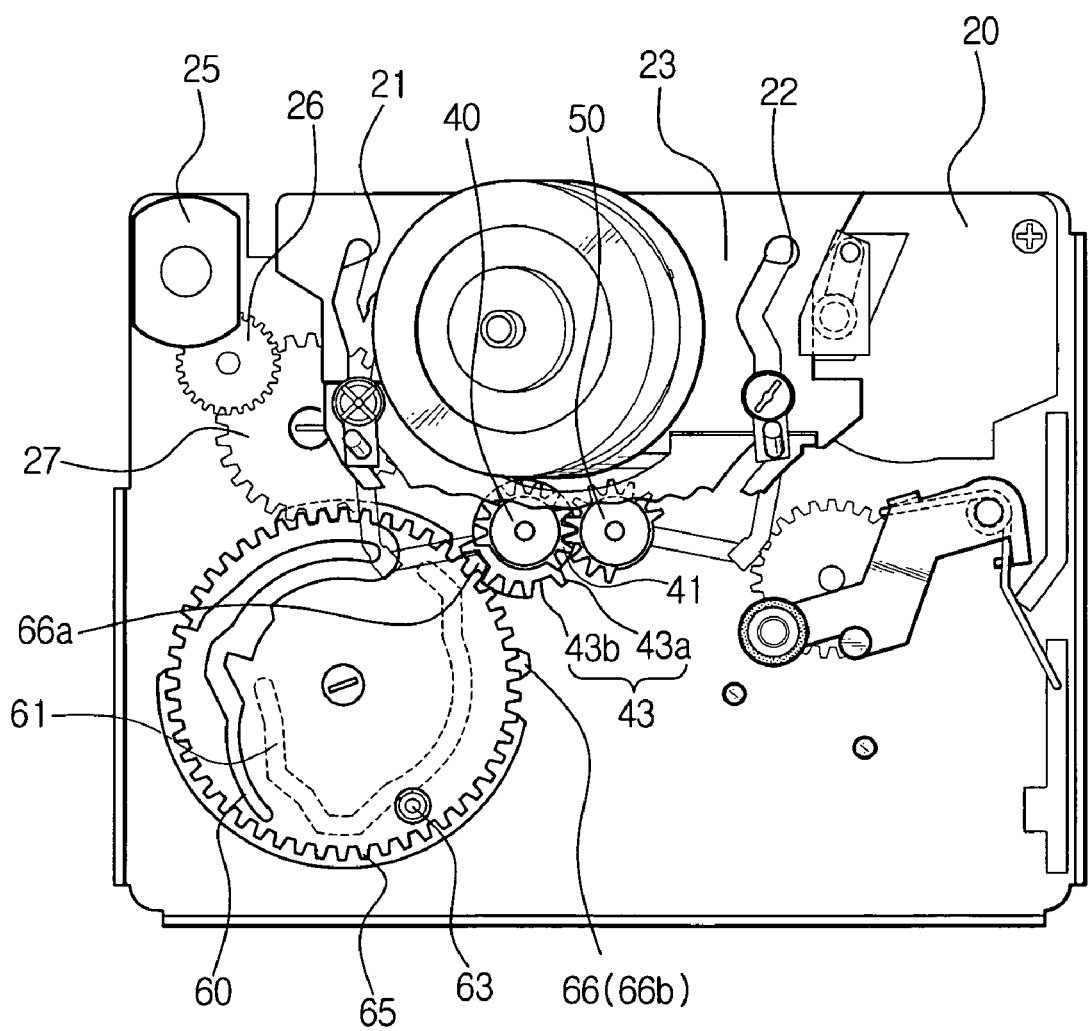
FIGS. 5–7 are plan views respectively showing an operation of the pole-base assembly driving apparatus according the present invention.
Figure 6:
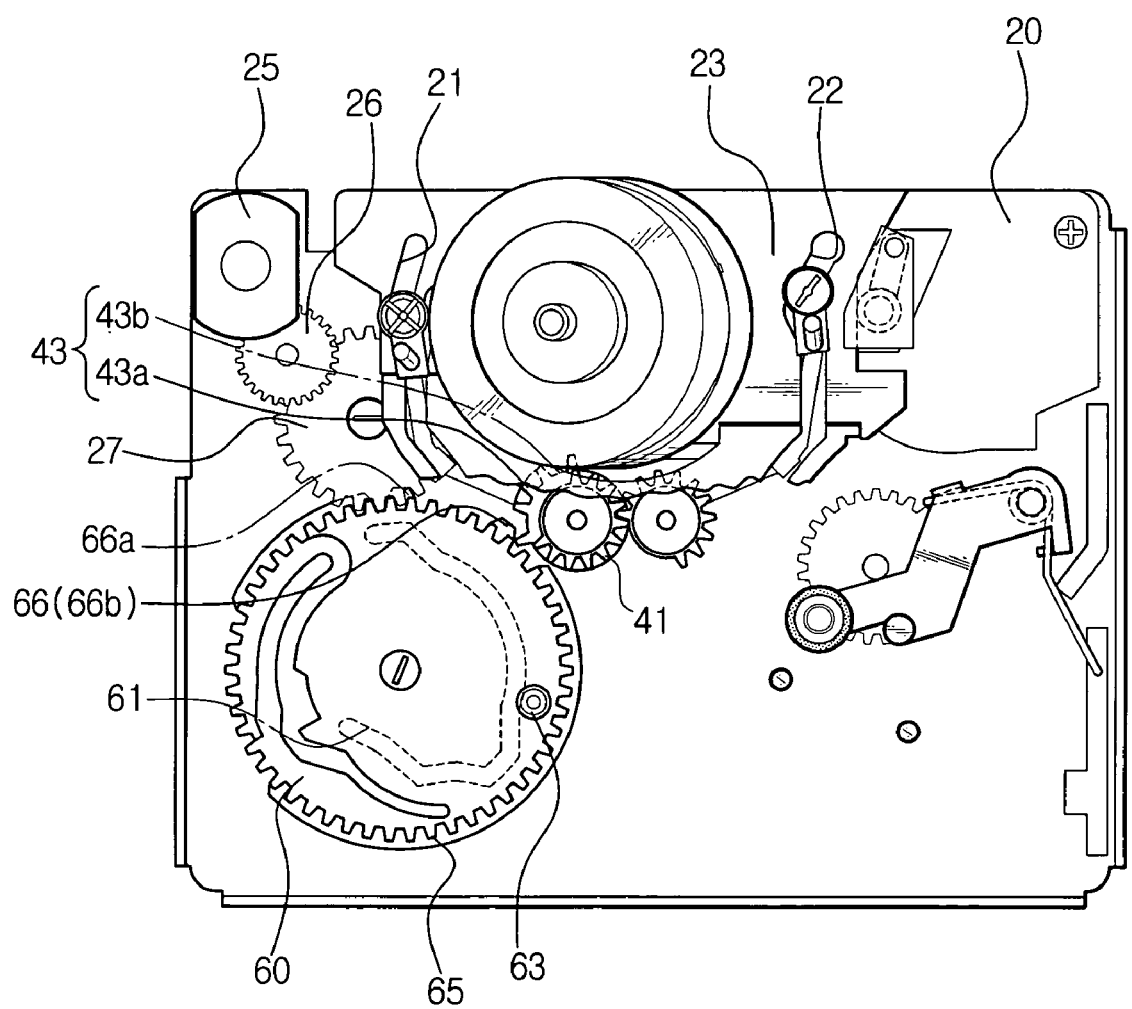

FIG. 3 shows the pole-base assembly driving apparatus in an unloading status. In this status, the main gear 60 is rotated in the A direction by the rotation of the driving motor 25. The sub deck is then loaded by the guide pin 63 of the main gear 60. In the process, as shown in FIG. 5, the large gear tooth 66a of the main gear 60 is engaged with the gear groove 43b of the first loading gear 40. Thence, the second gear part 43 of the first loading gear 40 is interlocked with the main gear part 65 of the main gear 60. Then, as shown in FIG. 6, if the other large gear tooth 66b is out of the other gear groove 43b, the engagement of the main gear 60 and the first loading gear 40 is released.

As described above, while the first loading gear 40 is engaged with the main gear 60 and then rotated for a desired time at a desired angle, the second loading gear 50 is also rotated. As each loading gear 40, 50 is rotated, each of the first and second link members 35 and 37 is rotated and then spread. Each pole-base assembly 31, 33 is moved along the guide rail 21, 22.

Figure 7:
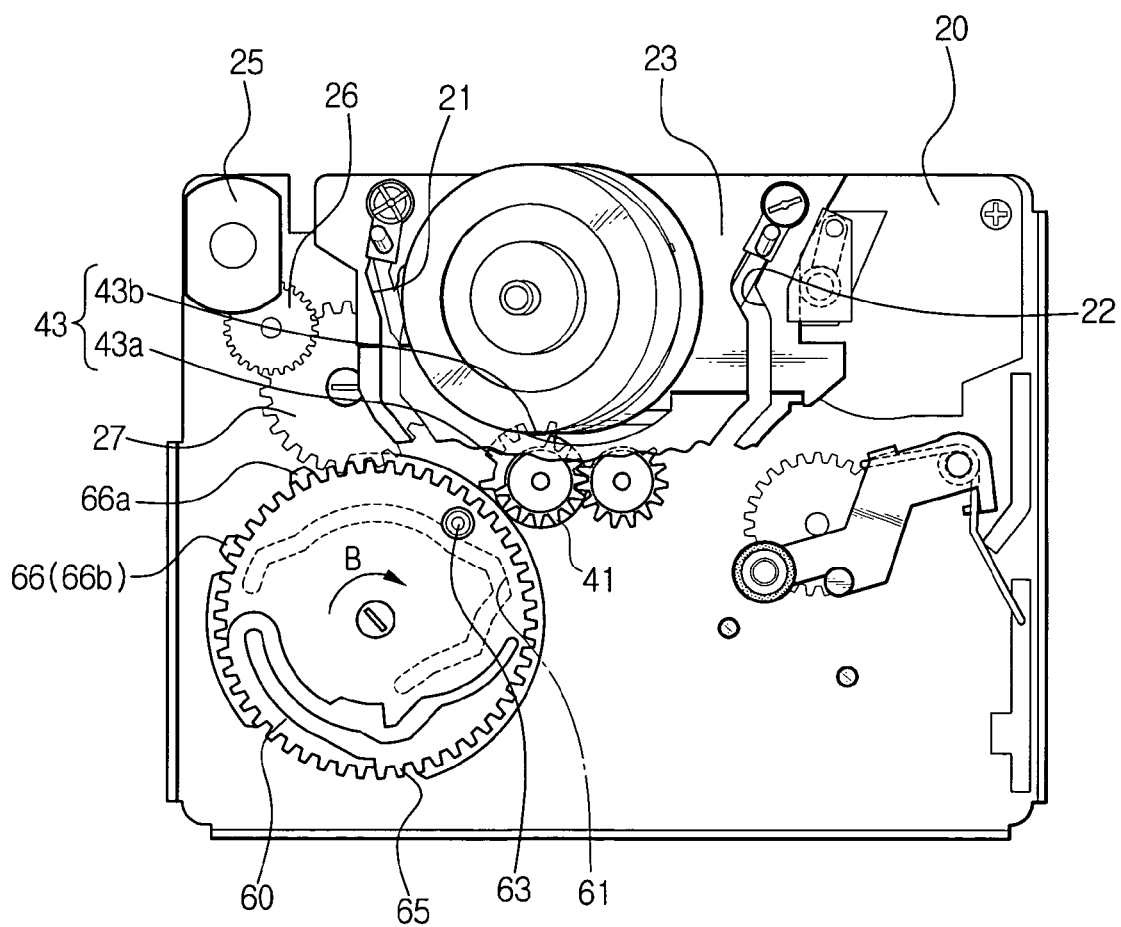

In this situation, the main gear 60 is adapted to be further rotated, as shown in FIG. 7. However, since the first loading gear 40 is disconnected from the main gear 60, the first loading gear 40 is not rotated any longer and only the main gear 60 is further rotated. The slide wing part 68 maintains contact with the non-gear part 43c of the second loading gear 40. Therefore, the free rotation of the first loading gear 40 is restricted by frictional force between the slide wing part 68 and the non-gear part 43c. Each of the pole-base assemblies 31 and 33 is maintained at a normal position.

As described above, since the main gear 60 interlocks with the sub deck, and the sliding member is directly engaged with the first loading gear 40, the structure is simplified and the number of components is reduced. Further, the assembling process becomes simpler, and manufacturing costs are also reduced.

In the same manner as described above, the pole-base assemblies 31, 33 are loaded by the rotation of the main gear 60. If the main gear 60 is rotated in the B direction in FIG. 7, the first loading gear 40 can be rotated within only a desired region in a reverse order of the loading operation. Therefore, the loading/unloading operation can be performed with the simple structure.

In the pole-base assembly driving apparatus for the magnetic recording/reading apparatus in accordance with an embodiment of the present invention, the main gear is directly engaged with the loading gear. However, the power is transferred only in a desired region. Therefore, the loading/unloading operation of the pole-base assembly can be performed with a simple structure.

Therefore, since the number of components is reduced and the structure can be simplified, the number of assembling processes and a manufacturing cost can be reduced.

While the present invention has been described in detail, it should be understood that various changes, substitutions and alterations can be made hereto without departing from the spirit and scope of the invention as defined by the appended claims.

What is claimed is:

1. A driving apparatus for loading/unloading a pair of pole-base assemblies which are reciprocated along a guide rail formed on a main deck to move a magnetic tape to contact with a head drum, comprising:
    a first and a second link members, each connected with one end to one pole-base assembly;
    a first and a second loading gears, each connected to the other ends of the first and the second link members, the first and the second loading gears being engaged with each other to be driven in association with each other, the first loading gear comprising a first gear part engaged with the second loading gear, and a second gear part stepped with respect to the first gear part, the second gear part having a large gear groove formed at both ends, the large gear groove being formed to be relatively deeper than other neighboring gear grooves; and
    a main gear which is rotated by power received from a driving motor mounted on the main deck, the main gear being selectively engaged with the first loading gear at the second gear part upon rotation thereof,
    wherein the main gear is rotated in association with one of the loading gears within a desired rotation range upon rotation so as to transfer power to load/unload the pole-base assembly, and the large gear grooves formed at both ends of the second gear part are a starting point for engagement with the main gear in the rotational direction of the main gear.

2. The driving apparatus of claim 1, wherein the second gear part is formed at a lower position than the first gear part and has a larger diameter than the first gear part.

3. The driving apparatus of claim 1, wherein the second gear part has a gear tooth formed at only a desired region of an outer surface of the first loading gear so as to be engaged with the main gear at only the desired region.

4. The driving apparatus of claim 1, wherein the main gear has a pair of large gear teeth corresponding to the large gear groove, the large gear teeth being formed to be relatively larger than other neighboring gear teeth.

5. The driving apparatus of claim 4, wherein the pair of large gear teeth is formed at a position lower than other gear teeth formed at an outer circumference of the main gear.

6. The driving apparatus of claim 1, wherein the main gear has a pair of large gear teeth formed at an outer circumference of the gear teeth receiving the power from the driving motor, and the gear teeth in a predetermined region are engaged or disengaged with the second gear part, starting from the pair of large gear teeth which are relatively larger than the gear tooth.

7. The driving apparatus of claim 1, wherein the main gear comprises:
    a main gear part formed at an outer circumference so as to receive the power from the driving motor;
    a connecting gear part formed at a desired region so as to be engaged with the second gear part at a position lower than the main gear part;
    a pair of large gear teeth formed at both ends portion of the connecting gear part so as to correspond to each large gear groove, the pair of large gear teeth being larger than the connecting gear part; and
    a slide wing part protruding in the form of an arc at a position lower than the main gear part so as to slidably contact the outer circumference of the second gear part.

8. A driving apparatus for loading or unloading a pair of pole-base assemblies which are reciprocated along a guide rail formed on a main deck to move a magnetic tape to contact a head drum, comprising:
    a first link member with a first and a second end, the first end of the first link member being connected to a first pole-base assembly;
    a second link member with a first and a second end, the first end of the second link member being connected to a second pole-base assembly;
    a first loading gear connected to the second end of the first link member, the first loading gear having a first gear part, a second gear part, and a non-gear part, the second gear part being stepped with respect to the first gear part;
    a second loading gear connected to the second end of the second link members, the second loading gear being engaged with the first gear part of the first loading gear so that it is driven in association with the first gear; and
    a main gear which is rotated by power received from a driving motor mounted on the main deck, the main gear being selectively engaged with the first loading gear upon rotation of the main gear so as to load or unload the pole base assemblies, the main gear comprising:
    a main gear part formed at an outer circumference so as to receive power from the driving motor;
    a connecting gear part formed at a desired region so as to engage the second gear part of the first loading gear at a position lower than the main gear part;
    a slide wing part protruding in the form of an arc at a position lower than the main gear part so as to slidably contact the non-gear part of the first loading gear to restrict free rotation of the first loading gear.

9. A driving apparatus as claimed in claim 8, wherein:
    the second gear part of the first loading gear has a large gear groove formed at both ends as a starting point for engagement with the main gear in the rotational direction of the main gear, the large gear groove being formed to be relatively deeper than other neighboring gear grooves.

10. A driving apparatus as claimed in claim 9, wherein the connecting gear part has a pair of large gear teeth formed at both ends to correspond to each large gear groove, the pair of large gear teeth being larger than the connecting gear part.

11. A driving apparatus for moving a pair of pole-base assemblies in a recording/reading apparatus, comprising:
   a first link member with a first and a second end, the first end of the first link member being connected to a first pole-base assembly;
   a second link member with a first and a second end, the first end of the second link member being connected to a second pole-base assembly;
   a first loading gear connected to the second end of the first link member, the first loading gear having a first gear part, a second gear part, and a non-gear part;
   a second loading gear connected to the second end of the second link members, the second loading gear being engaged with the first gear part of the first loading gear to be driven by the first gear; and
   a main gear rotated by a driving motor, the main gear being selectively engaged with the first loading gear upon rotation of the main gear so as to move the pole base assemblies, the main gear comprising:
   a main gear part formed at an outer circumference so as to receive power from the driving motor;
   a connecting gear part formed at a desired region so as to engage the second gear part of the first loading gear at a position lower than the main gear part;
   a slide wing part protruding in the form of an arc at a position lower than the main gear part so as to slidably contact the non-gear part of the first loading gear to restrict free rotation of the first loading gear.

12. A driving apparatus as claimed in claim 11, wherein the second gear part is stepped with respect to the first gear part.

13. A driving apparatus as claimed in claim 11, wherein:
   the second gear part of the first loading gear has a large gear groove formed at both ends of the second gear part, the large gear grooves being relatively deeper than other neighboring gear grooves.

14. A driving apparatus as claimed in claim 13, wherein the connecting gear part has a pair of large gear teeth formed at both ends to correspond to each large gear groove, the pair of large gear teeth being larger than the connecting gear part.

* * * * *